J. N. WARREN.
TOOL POST SCREW AND METHOD OF MAKING THE SAME.
APPLICATION FILED APR. 17, 1913.

1,094,825. Patented Apr. 28, 1914.

Witnesses.
Inventor:
John N. Warren

UNITED STATES PATENT OFFICE.

JOHN NEWTON WARREN, OF LANCASTER, PENNSYLVANIA, ASSIGNOR OF ONE-THIRD TO HENRY E. WARREN AND ONE-THIRD TO HENRY E. MACK, JR., BOTH OF LANCASTER, PENNSYLVANIA.

TOOL-POST SCREW AND METHOD OF MAKING THE SAME.

1,094,825.     Specification of Letters Patent.     Patented Apr. 28, 1914.

Application filed April 17, 1913. Serial No. 761,680.

*To all whom it may concern:*

Be it known that I, JOHN NEWTON WARREN, a citizen of the United States, residing at Lancaster, in the county of Lancaster and State of Pennsylvania, have invented certain new and useful Improvements in Tool-Post Screws and Methods of Making the Same; and I do hereby declare the following to be a full, clear, and exact description of the invention, such as will enable others skilled in the art to which it appertains to make and use the same.

The present invention relates to an improvement in tool post screws.

The object of the invention is to cheapen the cost of tool post screws while maintaining their strength and durability unimpaired.

To this end the invention consists in the tool post screw hereinafter described and particularly defined in the claims.

Figure 1:
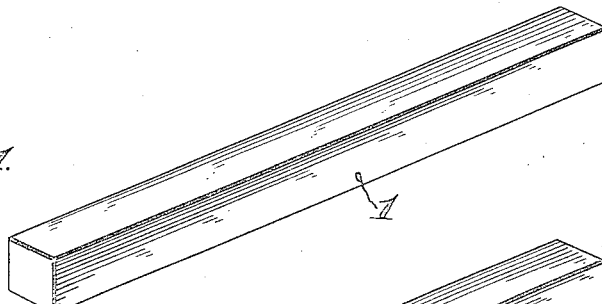
Figure 2:
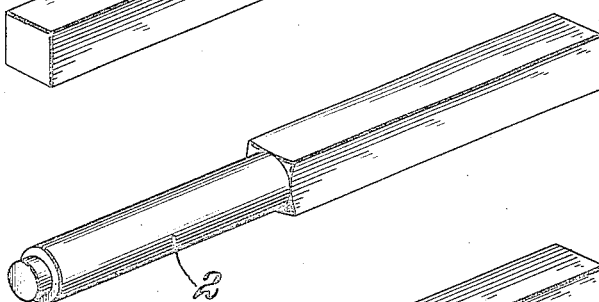
Figure 3:
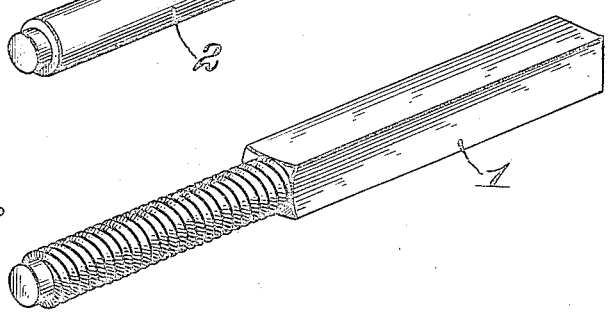
Figure 4:
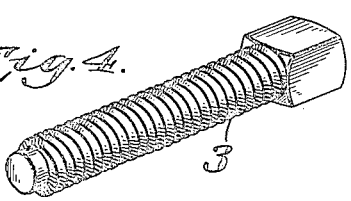
Figure 5:
Figure 6:
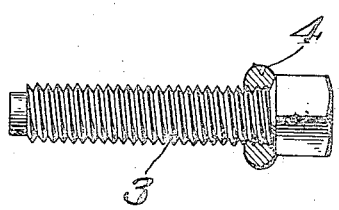
Figure 7:
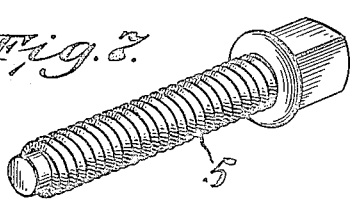

In the accompanying drawings illustrating the screw and its mode of manufacture, Figure 1 is a bar of the stock from which the screws are made; Fig. 2 shows the bar after the first operation of turning the shank of the screw; Fig. 3 shows the same after the screw is threaded; Fig. 4 shows it after the screw is cut off; Fig. 5 shows the collar; Fig. 6 is an elevation of the tool post screw complete, showing the collar in section; and Fig. 7 is a perspective view of the same.

Square steel stock is used of the size of the head of the screw to be made. A bar of stock 1 is first turned to form the shank 2 of the screw (see Fig. 2). It is then threaded (see Fig. 3) and lastly cut off from the bar 1 making the partially finished screw 3 (see Fig. 4). To this screw is now applied the collar 4 screwthreaded internally and screwed on the shank 2 tight against the head of the screw, as shown in Fig. 6. The screw is then hardened and the finished screw 5 is shown in Fig. 7.

This method of manufacturing screws is very much less expensive than the method heretofore practised, not only by reason of the smaller-sized stock which is used, but also by reason of the cheapening of the operations performed upon that stock. Heretofore, in order to provide the screw with a collar of the size of the diagonal of the head, round stock somewhat greater in diameter than the size of the diagonal of the head was used. As a result of this, from one-third to one-half more stock was required in making the same number of screws. This metal is expensive and the operation of turning off the large amount of excess stock added still further expense. In the screw of the present invention, not only is economy of stock and labor secured, as above pointed out, but by reason of the fact that square stock is used of the size of the head, the head requires no finishing; when the shank is finished and the screw is cut off from the bar, the screw is complete, whereas in the old method of making these screws, after the shank was turned down it was necessary to mill the head. The collar which is screwed hard against the underside of the head is as securely held in position as is necessary to enable it to withstand the severest service to which it is put. These collars are cheaply produced from tubular stock in a screw machine. The resulting screw is very much cheaper than the old form of screw by reason of the economies practised in the method of its manufacture, and it has all of the requisite qualities of the integral tool post screw in that it is made of the proper material and is hardened and finished in the usual manner.

Having thus described the invention, what is claimed is:—

1. The method of making hard steel tool post screws which consists in subjecting a rod of square steel stock of the size of the head of the screw to be made to the operation of turning to form the shank of the screw, threading said shank, cutting the screw off from the bar, screwing an internally screw threaded collar on the screw shank tight against the head of the screw, and hardening the screw, substantially as described.

2. As an article of manufacture, a hard steel tool post screw having a threaded shank, a square head at one end of the shank having its side of substantially the same size as the diameter of the shank, and an internally screwthreaded round collar of greater outside diameter than the side of the head fitting and held on the shank tight against the underside of the head, substantially as described.

JOHN NEWTON WARREN.

Witnesses:
   HARVEY B. LUTZ,
   HELEN LEVAN.